United States Patent [19]

Rissmann et al.

[11] Patent Number: 4,557,920
[45] Date of Patent: Dec. 10, 1985

[54] PROCESS FOR MAKING FUMING NITRIC ACID

[75] Inventors: Edwin F. Rissmann, Annandale; Kendall B. Randolph, Arlington, both of Va.

[73] Assignee: Versar Inc., Springfield, Va.

[21] Appl. No.: 542,809

[22] Filed: Oct. 17, 1983

[51] Int. Cl.$^4$ ............................................. C01B 21/40
[52] U.S. Cl. ..................................... 423/393; 423/383
[58] Field of Search ........................ 423/371, 383, 393

[56] References Cited

U.S. PATENT DOCUMENTS 3,385,664  5/1968  Waldorf ............................... 423/393

FOREIGN PATENT DOCUMENTS 4729113  7/1972  Japan .................................... 423/393
127128  10/1980  Japan .................................... 423/393
1204247  9/1970  United Kingdom ................ 423/393

OTHER PUBLICATIONS

Sienko et al., *Chemistry*, Second Edition, McGraw-Hill Book Co., (1961), pp. 497, 498.
Mellor, *Inorganic and Theoretical Chemistry*, vol. VII, Longmans, Green and Co. (1947) pp. 563, 564.

Primary Examiner—John Doll
Assistant Examiner—Wayne A. Langel
Attorney, Agent, or Firm—Dowell & Dowell

[57] ABSTRACT

A process for making fuming nitric acid involving the reacting of nitrogen dioxide gas with dry hydrogen chloride gas to produce the fuming nitric acid directly, and to produce as a co-product nitrosyl chloride gas; separating the formed liquid fuming nitric acid from the reaction gases and co-product gas; and stripping the liquid product and demisting the gaseous product to complete their separation.

4 Claims, 1 Drawing Figure

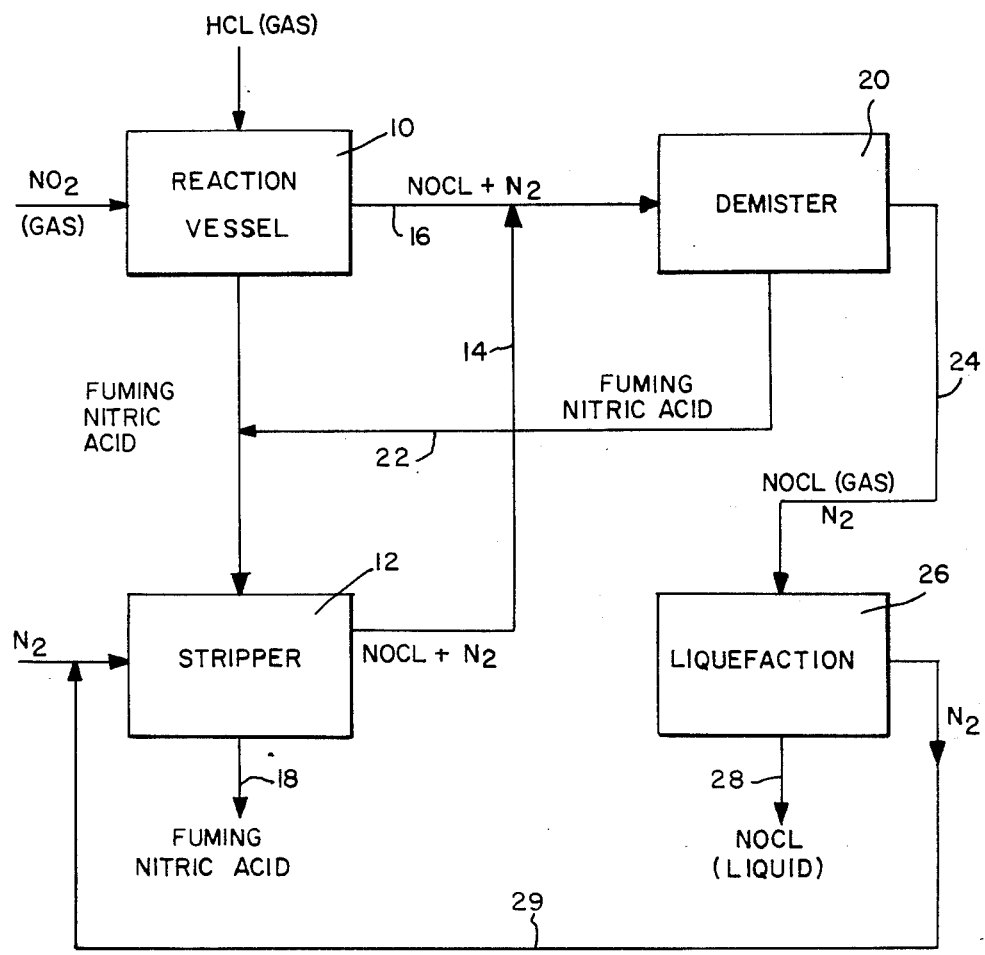

PROCESS FOR MAKING FUMING NITRIC ACID

This invention relates to an improved process for making fuming nitric acid directly without the use of distillation steps to concentrate hydrous nitric acid.

BACKGROUND AND PRIOR ART

Prior art processes for making fuming nitric acid involve steps that are energy intensive and thereby increase the cost of carrying out the processes. A conventional process generally involves treating oxides of nitrogen in the presence of oxygen and water to form nitric acid, and then concentrating the aqueous nitric acid using one or more distillation steps to remove the water. An example of such a process is shown in U.S. Pat. No. 1,989,267 to Care et al. Another conventional process first produces 63% nitric acid which is then mixed with concentrated sulfuric acid. Fuming nitric acid is then recovered from this mixture by distillation at temperatures ranging from 150° to 200° C., leaving as a co-product spent sulfuric acid containing the removed water which must then be either reconcentrated or disposed of. These processes involve considerable energy expenditure to achieve the distillation, and involve substantial waste acid disposal problems.

The purpose of this invention is to eliminate the above mentioned disadvantages by providing an improved process involving no distillation, and in which there is no need to add concentrated sulfuric acid to intermediately formed hydrous nitric acid for water removal purposes.

THE INVENTION

The present invention is a process wherein dry nitrogen dioxide gas is reacted directly with dry hydrogen chloride gas to produce fuming nitric acid in droplet form and nitrosyl chloride gas according to the equation:

The nitric acid is then stripped to remove any remaining trace of dissolved nitrosyl chloride, and the nitrosyl chloride gas is demisted to recover any entrained nitric acid.

OBJECTS AND ADVANTAGES OF THE INVENTION

It is a principal object of the invention to provide a process in which fuming nitric acid is directly produced at atmospheric pressure and temperature and comprises the only liquid phase product of the reaction whereby separation of the nitric acid can be achieved by ordinary stripping and demisting steps.

It is a further object of the invention to directly produce anhydrous nitric acid in the complete absence of water or water vapor so that no distillation steps are needed to concentrate the nitric acid, thereby lowering the energy costs, and making it unnecessary to add any dehydrating agents to an intermediately formed aqueous nitric acid product, the addition of such agents requiring subsequent separation steps to recover the agents followed by steps to dispose thereof or to reconcentrate them.

Another object of the invention is to provide a process in which all of the compounds present in the reaction chamber are in gaseous phase except the fuming nitric acid, thereby making recovery of the acid droplets easy.

Still another object of the invention is to provide a process in which the fuming nitric acid is formed and recovered virtually immediately, thereby avoiding the cost and the time delays involved in distillation steps as required in prior art processes which form an intermediate hydrous nitric acid product. This process lends itself well to automation.

THE DRAWING

The drawing is a diagram showing a process according to the invention.

PREFERRED EMBODIMENT OF INVENTION

Referring now to the drawing, the FIGURE shows in block diagram form a process for making fuming nitric acid according to this invention. The main step of the process is carried out in a large reaction vessel 10 under ambient temperature and pressure. Dry $NO_2$ gas is introduced into the vessel together with HCl gas and the two immediately react to form nitrosyl chloride gas (NOCl) and fuming nitric acid in the form of precipitated liquid droplets which run down the walls of the vessel 10 and are drawn off from the bottom thereof. The equation for the reaction is as follows:

The main separation of the liquid nitric acid from the reaction gases and the co-product introsyl chloride gas takes place in the reaction vessel 10. However, the nitric acid droplets which collect in the vessel are sent to a stripper 12 wherein nitrogen gas is bubbled through the liquid product to strip trace amounts of nitrosyl chloride gas that may be dissolved therein to return it via the path 14 to the output path 16 from the reaction vessel. The stripped fuming nitric acid is then drawn from the stripper at the outlet 18 for sale or other disposal.

The gaseous co-product NOCl from the main reaction vessel 10 and the stripped NOCl entrained in $N_2$ gas from the stripper 12 are then combined through the paths 14 and 16 and introduced into a demister 20 wherein any remaining droplets of fuming nitric acid are removed and reintroduced via the path 22 into the stripper 12. The demisted NOCl and $N_2$ gases are subsequently withdrawn along the path 24 and processed to achieve liquification of the NOC1, for instance by cooling the gases in a liquifaction system 26. The liquified NOC1 is then withdrawn at 28 for disposal and the $N_2$ gas is either vented or recycled via the path 29 into the stripper.

There are a number of options for disposal of the nitrosyl chloride gas. For example, it can be catalytically oxidized to form $NO_2$ and chlorine; it can be used as nitrosating agent in a Friedel-Krafts type of process to manufacture nitroso compounds; or it can be oxidized to nitryl chloride for use as a nitration reagent in a Friedel-Krafts type of process for the manufacture of nitro compounds with an HCl co-product.

This invention is not to be limited to the exact example shown in the drawing for changes may be made therein within the scope of the following claims.

We claim:

1. A gas-phase reaction process for making fuming nitric acid exclusively from dry gaseous $NO_2$ and dry gaseous HCl consisting of the steps of:

(a) reacting said dry nitrogen dioxide gas with said dry hydrogen chloride gas to directly produce liquid droplets of fuming nitric acid and nitrosyl chloride gas;
(b) collecting the droplets of fuming nitric acid as a liquid and stripping the liquid to remove nitrosyl chloride and other trace gases dissolved therein;
(c) collecting the nitrosyl chloride gas and any stripped trace gases and demisting them to recover entrained fuming nitric acid therefrom; and
(d) recovering the liquid fuming nitric acid produced by said process.

2. The process as set forth in claim 1, wherein the stripping of the liquid includes the bubbling of dry nitrogen gas through the luquid and the subsequent mixing of the nitrogen gas and entrained trace gases with the nitrosyl chloride gas collected for demisting.

3. The process as set forth in claim 2, wherein the mixed and collected gases after demisting are cooled to liquify the nitrosyl chloride gas contained therein and for separation thereof in liquid phase.

4. The process as set forth in claim 3, wherein the nitrogen gas remaining after liquifaction of the nitrosyl chloride gas is recycled into the stripper.

* * * * *